Feb. 10, 1925. 1,526,280
H. HENRICH
APPARATUS FOR CLEANING GAS AND VAPORS, MORE ESPECIALLY
BLAST FURNACE GASES
Filed Aug. 15, 1921
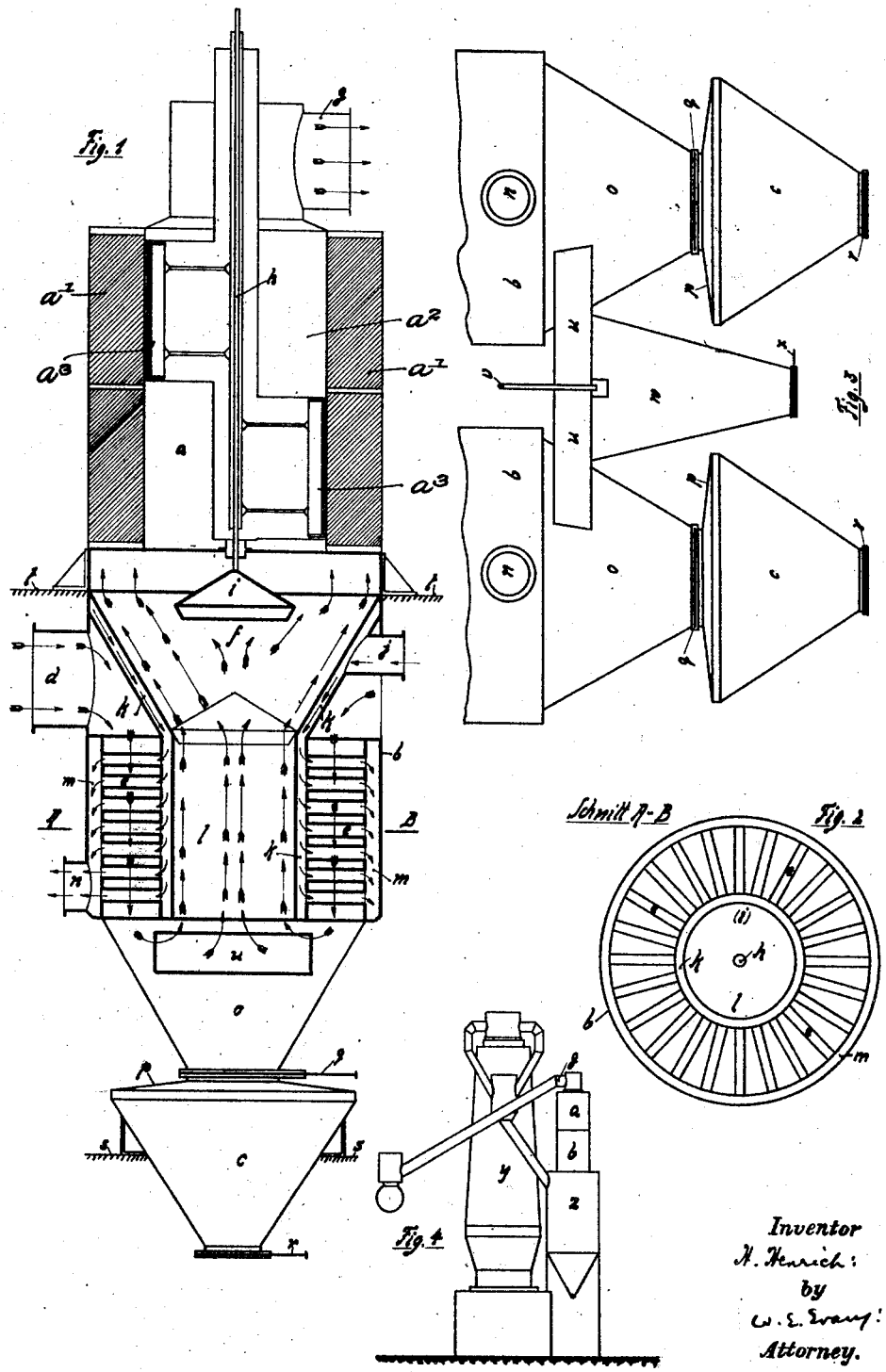

Patented Feb. 10, 1925.

1,526,280

UNITED STATES PATENT OFFICE.

HERMANN HENRICH, OF DUISBURG, GERMANY, ASSIGNOR TO DEUTSCHE MASCHINEN-FABRIK A. G., OF DUISBURG, GERMANY.

APPARATUS FOR CLEANING GAS AND VAPORS, MORE ESPECIALLY BLAST-FURNACE GASES.

Application filed August 15, 1921. Serial No. 492,489.

*To all whom it may concern:*

Be it known that I, HERMANN HENRICH, a citizen of the German State, residing at 112 Hindenburgstrasse, Duisburg, Germany, have invented a certain new and useful Apparatus for Cleaning Gases and Vapors, More Especially Blast-Furnace Gases, of which the following is a specification.

The present invention has for its object to provide an apparatus for preventing loss of temperature in the gases to be cleaned, and simultaneously effect a saving in space and material.

According to the invention the filter and the preheater are combined into a single enclosed apparatus so that pipes for connecting the two sets of apparatus are rendered superfluous. The filter and the pre-heater are advantageously disposed one above the other, but it is immaterial to the invention whether the filter surfaces are disposed above the preheater or whether the latter is disposed above the filter surfaces. This last mentioned disposition has the advantage over the first named arrangement that it prevents the particles of dust deposited on the filter surfaces from passing in the opposite direction to the current of gas into the dust receptacle; thus dust already separated cannot possible return to the filter surfaces. Furthermore the heating medium in the new apparatus is carried along in such a way that it surrounds the passage along which travel the gases to be cleaned in the preheater. The principal advantages of the apparatus according to the invention are economy combined with compactness of construction. Moreover, the use of the apparatus for blast furnaces secures the further advantage that the apparatus may be erected above the usual furnace dust receptacle. Furthermore, the pipes which it has hitherto been necessary to provide between the furnace dust receptacle and the cleaner are rendered superfluous. In this case also, the apparatus may be at once attached to any furnace, even where the space round the furnace is limited. Finally, the lid of the dust receptacle, that is, of the receptacle of the apparatus itself or of the furnace dust receptacle can be used for taking up vertical expansion of the material caused by the heat, and thus the two parts of the apparatus, can be, very conveniently erected one above the other and firmly secured without the various structural elements being subjected to harmful strains due to vertical expansion.

The invention is illustrated diagrammatically in the drawing by way of example.

Figure 1 illustrates a vertical section of the combined apparatus, in which the filter surfaces are disposed above the preheater.

Figure 2 is a cross section on A—B of Figure 1.

Figure 3 is a part view of two apparatus adjacently disposed and connected together;

Figure 4 illustrates the apparatus in combination with the dust receptacle of a blast furnace.

$a$ is a filter of known construction, $b$ the preheater, and $c$ the dust receptacle.

The filter $a$ comprises a circumferential series of filter pockets $a^1$, the cavities between the filtering surfaces being open towards the lower end of the filter for the upward admission of the gases to be cleansed. The filter pockets $a^1$ thus form a central outlet $a^2$ into which the cleansed gases issue and from which they pass to the outlet pipe $g$. A filter of this type is described in the specification of the co-pending application No. 492,494. At $a^3$ are indicated rotating nozzles for the admission of air under pressure as a means for removing the dust from the filter pockets. It will be understood, however, that any other filter of known construction may be employed and that neither the construction of the illustrated filter $a$ nor the nozzles $a^3$ form a part of the present invention.

From the drawing it will be seen that filter and preheater are combined to form an enclosed apparatus, in such manner that the gases to be cleaned (shown by feathered arrows), which enter the preheater $b$ by way of the pipe $d$, after flowing through the system of heating pipes $e$ and through the cone $f$ pass directly into the filter $a$ and thence out through the pipe $g$. The cone $f$ is opened and shut by means of a closure plate $i$ controlled from without by a rod $h$, so that the supply of gas to the filter $a$ can be quite simply interrupted at any time. The heating gases or vapors (shown by unfeathered arrows) enter through the pipe $j$, circulate through the annular space $k$ surrounding the cone $f$, flow round the inner cylinder $l$ which is likewise surrounded by the annulus $k$; they then pass through the heating pipes $e$ and through the outer hollow jacket $m$ of the preheater $b$, and finally leave the latter through the pipe $n$. The gases to be cleaned travel exclusively inside heated chambers insulated on the outside by the heating medium to prevent loss of heat, so that they retain without loss their original temperature and receive the necessary increase in temperature through the preheater. The lower closure of the preheater $b$ is formed into a funnel $o$, which opens into the dust receptacle $c$. The cover plate $p$ of the dust receptacle $c$ is formed as a flexible or resilient plate, which can be bent up and down within certain limits. Between the funnel $o$ and the dust receptacle $c$, also at the bottom of the latter, there are provided sliding doors $q$ and $r$. The combined apparatus is advantageously fixed in position at two positions $s$ and $t$, namely, where the filter $a$ is connected to the preheater $b$, and at the dust receptacle $c$. Thus the vertical distance from $s$ to $t$ is fixed. If the two apparatus $a$ and $b$ increase in length due to changes in temperature, $a$ can freely expand upwards, whereas $b$ passes the changes on to the dust receptacle $c$, where they are effected without injury by drawing up or depressing the flexible cover plate $p$.

If two similar apparatus are provided side by side, they are combined in known manner; for example by a passage $u$, which connects the two funnels $o$ and which is provided with a sliding door $v$. This passage $u$ may likewise be advantageously provided with a dust receptacle $w$, which is divided into two by a vertical partition wall to correspond to the two cleaners and is provided with a single sliding bottom $x$ for the two divisions.

In Figure 4 the blast furnace is represented by $y$ and the dust receptacle by $z$ immediately above which latter the preheating and filtering plant is erected.

The purpose and manner of working the apparatus the subject matter of the invention are clear from the foregoing by reference also to the drawings. Furthermore, it is clear that the proposed combination and construction of filter and preheater very considerably reduces space and materials; moreover, by the elimination of all pipes on the one hand and the exterior insulation of the gases to be cleaned by the heating medium on the other the problem is solved of preventing loss of heat and reducing heating temperature to a minimum.

I claim:

1. In apparatus for purifying, by means of dry filters, gases and vapors and more especially blast furnace gases, comprising a filter, a pre-heater disposed below said filter for pre-heating the gases before filtration and a single casing enclosing said filter and said pre-heater, a dust receptacle below said pre-heater and a conduit extending from the filter for the passage of separated dust to the said dust receptacle, said conduit serving to prevent contact of said separated dust with said pre-heater.

2. In apparatus for purifying, by means of dry filters, gases and vapors, more especially blast furnace gases comprising a filter, a pre-heater disposed below said filter for pre-heating the gases before filtration and a single casing enclosing said filter and said pre-heater, a dust receptacle below said pre-heater and a conduit extending downwardly from said filter, said conduit serving as a passage both for the pre-heated gases to the filter and for the separated dust from the said filter to said dust receptacle.

3. In apparatus for purifying, by means of dry filters, gases and vapors, more especially blast furnaces comprising a filter, a pre-heater disposed below said filter for pre-heating the gases before filtration and a single casing enclosing said filter and said pre-heater, an annular pre-heater, a dust receptacle below said annular pre-heater and said filter, and a centrally disposed conduit extending downwardly from said filter through said annular pre-heater, said conduit serving as a passage both for the pre-heated gases from the pre-heater to the filter and for the separated dust from said filter to said dust receptacle.

4. In apparatus for purifying, by means of dry filters, gases and vapors, more especially blast furnace gases, comprising a filter, a pre-heater disposed below said filter and a single casing enclosing said filter and said pre-heater, a dust receptacle below said pre-heater, said dust receptacle having a cover in the form of a flexible plate adapted for being bent to accommodate the expansion and contraction of the respective elements of the apparatus, and a conduit extending from the filter for the passage of separated dust to the said dust receptacle, said conduit serving to prevent contact of said separated dust with said pre-heater.

5. In apparatus for purifying, by means of dry filters, gases and vapors, more especially blast furnace gases, comprising a filter, a pre-heater disposed below said filter and a single casing enclosing said filter and said pre-heater, a pre-heater formed with double and concentric annular jackets for the heating medium and forming centrally an upward outlet for the pre-heated gases to the filter and forming between the said annular jackets an annulus through which the gases to be pre-heated are passed before admission to the centrally disposed upward outlet, tubes extending and communicating between said annular jackets, an inlet for the heating medium to the inner annular jacket, an outlet for the heating medium to the outer annular jacket, an inlet to the pre-heater for the gases to be cleansed and a dust receptacle below said centrally disposed upward outlet.

HERMANN HENRICH.